(12) United States Patent
Kuehne et al.

(10) Patent No.: US 10,216,328 B2
(45) Date of Patent: Feb. 26, 2019

(54) METHOD FOR OPERATING A TOUCH-SENSITIVE CONTROL SYSTEM AND DEVICE HAVING SUCH A CONTROL SYSTEM

(71) Applicant: AUDI AG, Ingolstadt (DE)

(72) Inventors: Marcus Kuehne, Ingolstadt (DE); Johann Schneider, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/776,496

(22) PCT Filed: Feb. 21, 2014

(86) PCT No.: PCT/EP2014/000463
§ 371 (c)(1),
(2) Date: Sep. 14, 2015

(87) PCT Pub. No.: WO2014/139632
PCT Pub. Date: Sep. 18, 2014

(65) Prior Publication Data
US 2016/0041690 A1    Feb. 11, 2016

(30) Foreign Application Priority Data

Mar. 15, 2013   (DE) .................. 10 2013 004 620

(51) Int. Cl.
*G06F 3/045*  (2006.01)
*G06F 3/041*  (2006.01)
(Continued)

(52) U.S. Cl.
CPC ............ *G06F 3/0418* (2013.01); *B60K 37/06* (2013.01); *G06F 3/016* (2013.01); *G06F 3/0414* (2013.01);
(Continued)

(58) Field of Classification Search
CPC ........ G06F 3/041; G06F 3/044; G06F 3/0414; G06F 3/0416; G06F 3/0418
(Continued)

(56) References Cited

U.S. PATENT DOCUMENTS 7,920,126 B2 *  4/2011  Prados ................ G06F 3/03547
                                                          345/156
8,390,592 B2 *  3/2013  Grundmann ........... B60K 35/00
                                                          345/173
(Continued)

FOREIGN PATENT DOCUMENTS

CN           102498461 A       6/2012
DE       10 2008 050181          4/2010
(Continued)

OTHER PUBLICATIONS

Written Opinion for International Application PCT/EP2014/000463 dated Jul. 22, 2014.
(Continued)

*Primary Examiner* — Vijay Shankar
(74) *Attorney, Agent, or Firm* — Alston & Bird LLP

(57) ABSTRACT

The invention relates to a method for operating an operating system (10), in particular of a motor vehicle, having the steps: detecting by means of a pressure detection device whether an operating field (14) of the operating system (10) has been exposed by means of an actuating element (12) to a greater pressure than a predetermined pressure threshold value; if it is detected that the operating field (14) is exposed to a greater pressure than the pressure threshold value: outputting of at least one confirmation signal by means of the operating field (14); wherein by means of a detection device, the size of a contact area (22, 22') of the actuating element (12) that touches the operating field (14) is detected; the confirmation signal is output only if, during the pressure exertion on the operating field (14), it is detected that the (Continued)

Figure 1:
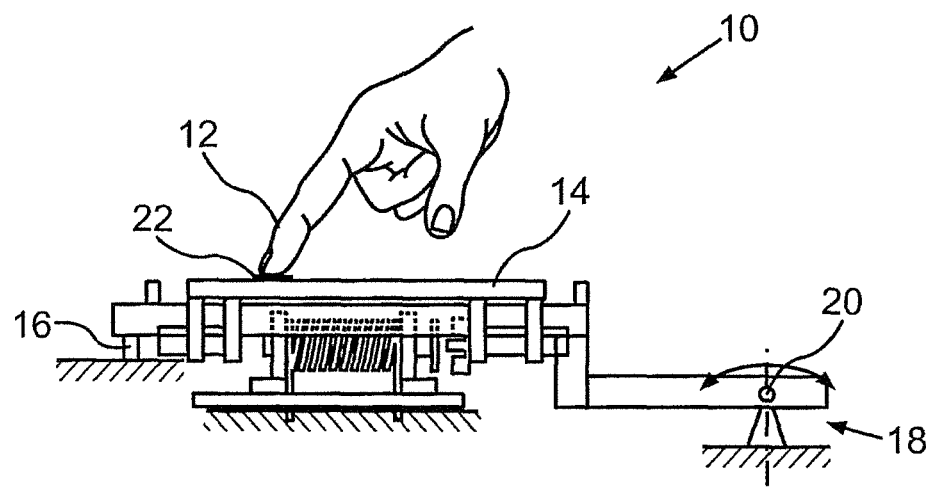

contact area (22, 22') of the actuating element (12) has been changed by a predetermined factor. The invention furthermore relates to a unit with an operating system (10).

9 Claims, 1 Drawing Sheet

(51) Int. Cl.
  *B60K 37/06* (2006.01)
  *G06F 3/01* (2006.01)
(52) U.S. Cl.
  CPC .... *G06F 3/0416* (2013.01); *B60K 2350/1028* (2013.01); *G06F 2203/014* (2013.01); *G06F 2203/04105* (2013.01)
(58) Field of Classification Search
  USPC .................................................. 345/173–183
  See application file for complete search history.

(56) References Cited

U.S. PATENT DOCUMENTS

| | | | |
|---|---|---|---|
| 8,626,380 B2* | 1/2014 | Styles | B60H 1/00985 340/562 |
| 9,069,404 B2* | 6/2015 | Hotelling | G06F 3/0414 |
| 9,244,549 B2* | 1/2016 | Lee | G06F 3/041 |
| 9,292,051 B2* | 3/2016 | Takata | G06F 3/0338 |
| 9,411,458 B2* | 8/2016 | Worfolk | |
| 9,509,303 B2* | 11/2016 | Suzuki | H03K 17/9647 |
| 2006/0146037 A1* | 7/2006 | Prados | G06F 3/016 345/173 |
| 2007/0265745 A1* | 11/2007 | Styles | B60H 1/00985 701/36 |
| 2009/0107737 A1 | 4/2009 | Reynolds et al. | |
| 2010/0200309 A1 | 8/2010 | Yilmaz et al. | |
| 2011/0141047 A1* | 6/2011 | Iwaizumi | G06F 3/016 345/173 |
| 2011/0141063 A1* | 6/2011 | Grundmann | B60K 35/00 345/175 |
| 2012/0154316 A1 | 6/2012 | Kono | |
| 2015/0097796 A1* | 4/2015 | Lisseman | B62D 1/04 345/173 |
| 2016/0054849 A1* | 2/2016 | Steiger | G06F 3/0414 345/173 |
| 2016/0117043 A1* | 4/2016 | Kim | G06F 3/044 345/174 |
| 2016/0137064 A1* | 5/2016 | Min | B60K 37/06 345/156 |

FOREIGN PATENT DOCUMENTS

| | | |
|---|---|---|
| DE | 10 2009 030592 | 12/2010 |
| DE | 10 2009 036369 | 2/2011 |
| DE | 10 2010 039545 | 2/2012 |
| EP | 0780981 | 6/1997 |
| WO | WO 2009/049812 | 4/2009 |

OTHER PUBLICATIONS

International Preliminary Report on Patentability (Chapter II) from International Application No. PCT/EP2014/000463, dated Apr. 24, 2015.
International Search Report for International Application PCT/EP2014/000463 dated Jul. 22, 2014.
Office Action for Chinese Patent Application No. 201480014708.0 dated Apr. 5, 2017, with English translation, 17 pages.

\* cited by examiner

METHOD FOR OPERATING A TOUCH-SENSITIVE CONTROL SYSTEM AND DEVICE HAVING SUCH A CONTROL SYSTEM

The invention relates to a method for operating an operating system, in particular of a motor vehicle, as well as to a unit with such an operating system of the type presented in the generic parts of the independent claims.

DE 10 2009 036369 A1 features a method for controlling a capacitive operating element of a vehicle. The operating element is divided here into several detection zones, wherein a respective resting time of a finger tip can be detected.

EP 0780981 A2 features a touch sensor element, in which the triggering of a switching signal occurs as a function of a predetermined threshold value of a signal level and of a predetermined time period.

DE 10 2010 039545 A1 features a method for detecting movements relative to a capacitive sensor system. Undesired erroneous triggering is avoided by way of appropriate predetermined time periods within which the threshold values have to be exceeded before a triggering of the capacitive sensor system occurs at all.

DE 10 2008 050181 A1 features a method for the recognition of a switching threshold value in capacitive switches. The recognition of a switching point here occurs by detection of a corresponding contact area of a finger.

The problem of the present invention is to provide a method as well as a unit of the above-described type, by means of which undesired erroneous triggering of a touch-sensitive operating system can be reduced.

The problem is solved by a method for operating a touch-sensitive operating element as well as by a unit with such an operating system having the features of the independent claims. Advantageous designs with advantageous and non-trivial variants of the invention are presented in the dependent claims.

In the method according to the invention for operating an operating system, in particular of a motor vehicle, it is detected, by means of a pressure detection device, whether an operating field of the operating system is exposed by means of an actuating element to a higher pressure than a predetermined pressure threshold value, and if it is detected that the operating field is exposed to a higher pressure than the pressure threshold value, at least one actuation signal is output by means of the operating field. In order to prevent undesired actuation or triggering of the operating system, it is provided in the method according to the invention that, by means of a detection device, the size of a contact area of the actuating element that touches the operating field is detected, and the actuation signal is output only if, during the pressure exertion on the operating field, it is detected that the contact area of the actuating element has been changed by a predetermined factor. Actuating element is understood to mean, for example, a finger of a user by means of which the operating field of the operating system is actuated or touched. The contact area of the actuating element touching the operating field can be, in the case of a finger, for example, a fingertip of an index finger or of any other finger of the user.

The underlying idea of the invention thus is that, as a kind of control mechanism, during the operation of the operating field, which can be a touchpad or the like, for example, it is always detected whether a contacting finger area or another contact area that touches the operating field is changed by a predetermined factor, for example, by a percentage to be defined. The predetermined change of the form of a factor that is used as relevant parameter here entails the advantage that physical differences between the fingers of different users are not relevant to the result, because the change of the contact area moves on a similar scale in the case of different users. However, the detection of the change of the contact area during the activation of the operating field is here used not for the pressure detection and for a possibly associated triggering of the operating field, but only to protect against undesired erroneous triggering.

In an advantageous embodiment of the invention, it is provided that the activation signal is output only if it has been detected that the contact area of the actuating element has been increased by the predetermined factor. Therefore, in the case of a finger, it is detected whether the contact area of the finger that touches the operating field has been increased by the predetermined factor, wherein the confirmation signal is output by the operating field only if this is the case. Alternatively, it is also possible that the confirmation signal is output only if, after the increase of the contact area by the predetermined factor, it has been detected that the contact area of the actuating element has subsequently been decreased by the predetermined factor or an additional predetermined factor. In other words, before a corresponding actuation of the operating field, a verification is carried out, for example, to determine whether the contacting finger area has been increased by a percentage to be defined and/or reduced again adequately before a release or corresponding pressure removal. Thus, the operating system can either be operated in such a manner that the confirmation signal is output only if a corresponding increase of the contact area of the actuating element has been detected, or in such a manner that the actuation signal is only output if a corresponding increase of the finger contact area with the corresponding subsequent decrease of the finger contact area has been detected.

An additional advantageous embodiment of the invention provides that the length of time is detected over which the increase by the predetermined factor and/or the decrease of the contact area by the predetermined factor or additional predetermined factor has occurred, and the confirmation signal is output only if the change of the contact area occurs within a predetermined time period. This leads to a reduction of undesired erroneous triggering by an operator. Here, it is preferable to establish the predetermined length of time in such a manner that it corresponds to a typical duration of actuation by a user who operates the operating field. For example, if the hand of the user comes to rest on the operating field and in the process a relatively slow pressure increase occurs, then, based on the simultaneous detection to determine whether the pressure exertion occurs in combination with a corresponding increase of the contact area within the predetermined time window, the result would be that no undesired triggering of the operating field occurs.

An additional advantageous embodiment of the invention provides that the length of time is detected over which the pressure exertion on the operating field occurs, and the confirmation signal is output only if the pressure threshold value has been exceeded within a predetermined time period. This decreases additionally the probability of an undesired erroneous triggering, since, in addition, the length of time of the pressure exertion and optionally a corresponding exceeding of the pressure threshold value are monitored.

In an additional advantageous embodiment of the invention, it is provided that, as confirmation signal, a haptically detectable feedback is output in the form of an at least partial shifting of the operating field in at least one spatial direction, in particular opposite the direction of the pressure application. A haptically detectable feedback can be a kind of simulated mechanical click which is produced by a corresponding shifting of the operating field and which resembles a real click as closely as possible. In other words, a mechanical actuation or a mechanical clicking of the operating field is thus imitated by means of the confirmation signal.

According to an additional advantageous embodiment of the invention, it is possible to provide that, as confirmation signal, alternatively or else additionally, an acoustic signal is output. This acoustic signal can be, for example, a kind of clicking noise imitating a sound that usually occurs when a mechanical switch is actuated, which thus gives the user an additional acoustic feedback when operating the operating field.

According to an additional advantageous embodiment of the invention, it is provided that the detection of the length of time over which the change of the contact area and/or the pressure exertion on the operating field occur(s) is started as soon as a contacting of the operating field by means of the operating element has been detected. Therefore, for example, if a hand, a finger or the like comes to rest on the operating field, the time detection or the detection of the duration is started. In combination with a correspondingly established threshold value for the change of surface area and/or the pressure exertion, undesired triggering of the operating field can be prevented. A typical case of use within a motor vehicle could be, for example, a situation where a hand or a portion of the hand of the user comes to rest on the operating field, and subsequently the vehicle travels over a bump, which would result in a corresponding increase of pressure and an increase of the area. Due to the fact that, in addition, the duration is detected, undesired erroneous triggering of the operating field can be prevented particularly in such cases. Indeed, if the hand, a finger or the like of a user comes to rest for a longer duration on the operating field, and if then a corresponding increase of the contact area and/or also a corresponding pressure exertion above the threshold value were to occur when traveling over a road bump or the like, no triggering of the operating field with a corresponding triggering of the confirmation signal occurs, since, as an additional condition, the time period is determined, which in such a case would be greater than the predetermined time period. A renewed triggering or actuation of the operating field with a corresponding confirmation signal could thus occur again only if the user removes his/her hand and/or finger or the like from the operating field and, for the purpose of actuating the operating field, actuates the latter again with the corresponding pressure and an associated corresponding increase of the finger contact area.

The unit according to the invention comprises an operating system, a pressure detection device, which is designed to detect whether an operating field of the operating system has been exposed by means of an actuating element to a greater pressure than a predetermined pressure threshold value, a control device which is designed so that, if it is detected that the operating field is exposed to a greater pressure than the pressure threshold value, it causes the outputting of at least one confirmation signal by means of the operating field. The unit according to the invention is characterized in that the operating system comprises a detection device, which is designed to detect the size of a contact area of the actuating element that touches the operating field, wherein the control device is designed so that it causes an outputting of the confirmation signal only if during the exertion of pressure on the operating field it is detected that the contact area of the actuating element has been changed by a predetermined factor. Advantageous embodiments of the method according to the invention here should be understood to be advantageous embodiments of the unit. The unit comprises here in particular means with which the process steps can be carried out.

In an advantageous design of the unit, it is provided that the unit is a motor vehicle, a smart phone, a notebook or a stationary computer, in which the operating system is integrated. In other words, the unit according to the invention or the operating system can be used both in a motor vehicle, a smart phone, a notebook and also in a stationary computer.

Additional advantages, features and details of the invention result from the following description of a preferred embodiment example and in reference to the drawing. The features and feature combinations mentioned above in the description as well as the features and feature combinations mentioned in the description of the figures and/or indicated only in the figures can be used not only in the respective indicated combination, but also in other combinations or separately, without exceeding the scope of the invention.

Below, embodiment examples of the invention are explained in further detail in reference to diagrammatic drawings.

Figure 2:
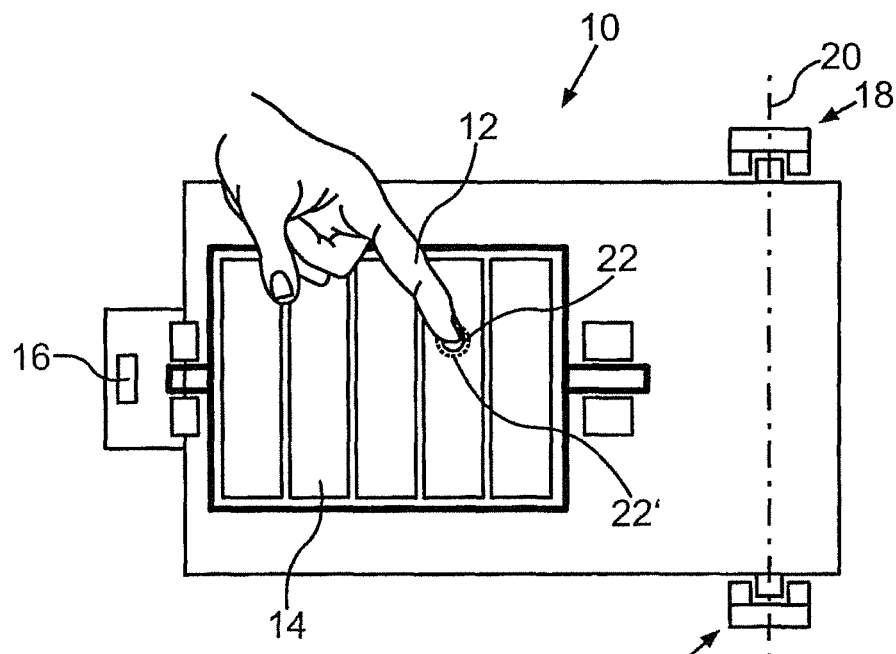

FIG. 1 shows a diagrammatic side view of an operating system comprising an operating field, precisely at that time it is actuated by means of a finger by a user; and FIG. 2 shows a diagrammatic top view of the operating system shown in FIG. 1.

A touch-sensitive operating system marked overall with 10 is shown in a diagrammatic side view in FIG. 1. Precisely at the time shown, a user, not marked more precisely, touches an operating field 14, which in the present case is a touch-sensitive touchpad, of the operating system 10 with his/her finger 12 used as actuating element. Alternatively, the operating field 14 can also be a touch screen which can be operated resistively, capacitatively, optically or inductively, for example.

The operating system 10 comprises a pressure sensor 16 with no displacement which can be designed as a strain gauge, for example. The pressure sensor 16 is part of a pressure detection device not marked further, which is designed so as to detect whether the operating field 14 is exposed by means of the finger 12 to a greater pressure than a predetermined pressure threshold value. Moreover, within a bearing 18, a sensor can be provided, by means of which a rotation about a rotation axis 20 of the bearing 18 can be detected for force evaluation. This sensor can also be part of the pressure detection device.

The operating system 10 comprises moreover a detection device not represented here, which is designed to detect the size of a contact area 22 of the finger 12 that touches the operating field 14. A control device of the operating system 10, which is not represented here, is designed here so that it causes an outputting of a confirmation signal only if, during a pressure exertion on the operating field 14, it has been detected that the contact area 22 of the finger 12 has changed by a predetermined factor. In addition, the control device can also be designed so as to bring about the outputting of the confirmation signal by means of the operating field 14 only if it is detected, in addition, that the operating field 14 has been exposed to a greater pressure than a predetermined pressure threshold value.

The operating system 10 can be integrated, for example, in a motor vehicle, a smart phone, a notebook or also within a stationary computer. For the purpose of the following explanation of a method for operating the operating system 10, it is assumed that the operating system 10 is integrated in a motor vehicle. But the process steps described below can here be carried out equally well in the case of an integration of the operating system 10 in a smart phone, a notebook or else in a stationary computer.

In FIG. 2, the operating system 10 is shown in a diagrammatic top view. As soon as the user applies his/her finger 12 on the operating field 14, it is detected by means of the pressure detection device whether the operating field 14 has been exposed by means of the finger 12 to a greater pressure than a predetermined pressure threshold value. In addition, by means of the detection device, the size of the contact area 22 touching the operating field 14 is detected. If it is detected that the operating field 14, on one hand, has been exposed to a greater pressure than the pressure threshold value and, on the other hand, during the pressure exertion on the operating field 14, it is detected that the contact area 22 of the finger 12 has been changed by a corresponding predetermined factor, a corresponding confirmation signal is output by means of the operating field 14.

During the actuation of the operating field, the contact area 22 of the finger 12 is increased in such a manner that the result is the contact area marked with reference numeral 22'. It is preferable that the confirmation signal is output only if it is detected that the contact area 22 of the actuating element has been increased by the corresponding predetermined factor to the contact area 22'. Alternatively, it is also possible to provide that the confirmation signal is output only if, after the increase of the contact area 22 by the predetermined factor up to the contact area 22', the contact area 22' of the finger 12 subsequently has been decreased again by the same predetermined factor or another different predetermined factor. In other words, it is possible to provide that the confirmation signal is only output if a corresponding increase of the area and a corresponding subsequent decrease of the area of the finger contact area have been detected.

During the actuation of the operating field 14, the length of time is detected additionally over which the increase by the predetermined factor and/or decrease of the contact area 22 by the predetermined factor or an additional predetermined factor occur(s), wherein the confirmation signal is output only if the change of the contact area 22 occurs within a predetermined time period. At the same time, the length of time is also detected over which the pressure application onto the operating field 14 occurs, wherein the confirmation signal is then also output only if the pressure threshold value has been exceeded within a predetermined time period.

As confirmation signal, a haptically detectable feedback is output in the form of an at least partial shifting of the operating field 14 opposite the direction of the pressure application. In other words, for the purpose of imitating a mechanical click, the operating field 14 is moved or shifted accordingly, so that the user can perceive a kind of switch actuation as soon as an increase of the contact area 22 of the finger 12 in combination with a corresponding pressure application onto the operating field 14 has been detected. In addition, the confirmation signal can also be associated with an acoustic signal, for example, in the form of a clicking sound, so that the user is also given an acoustic feedback indicating that an actuation of the operating field 14 by means of the finger 12 has occurred.

In particular, by the combined consideration of the increase and/or the decrease of the finger contact area coupled with a corresponding length of time over which this has to occur, undesired erroneous triggering of the operating field 14 can be avoided. For example, depending on where the operating field 14 is arranged, for example, inside a motor vehicle, it is certainly possible for the user to have placed his/her finger 12 or also his/her entire hand on the operating field 14. Now, for example, if the user or driver drives over a bump in the ground, an unintended or undesired pressure application onto the operating field 14 occurs. As a result of the fact that the length of time of the pressure application and the increase of the area are always measured as soon as the finger 12, or else, for example, the entire hand of the user comes to rest on the operating field 14, an undesired triggering of the operating field 14 when driving over a road bump can be avoided, since the actuation of the operating field 14 with a corresponding pressure and with the associated monitored increase of the area of the finger 12 has to occur over a typical time period for the confirmation signal to be output at all.

Thus if a user places his/her finger 12, additional fingers and/or his/her entire hand on the operating field 14 for a longer time period, the user first has to remove his/her finger 12 or his/her entire hand for a predetermined time period from the operating field before an actuation of the operating field 14 can occur. Alternatively, it can also be sufficient for the user to lift off, at least briefly, the finger 12 by means of which he/she would like to actuate the operating field 14.

The invention claimed is:

1. Method for operating an operating system, in particular of a motor vehicle, having the steps:
    detecting by means of a pressure detection device whether an operating field of the operating system has been exposed by means of an actuating element to a greater pressure than a predetermined pressure threshold value;
    if it is detected that the operating field is exposed to a greater pressure than the pressure threshold value: outputting of at least one confirmation signal by means of the operating field,
    wherein
    by means of a detection device, the size of a contact area of the actuating element that touches the operating field is detected,
    the confirmation signal is output only if, during the pressure exertion on the operating field, it is detected that the contact area of the actuating element has been changed by a predetermined factor; wherein the detection of the change of the contact area is used to protect against undesired erroneous triggering; and
    the confimation signal is a haptically detectable feedback, output in the form of an at least partial shifting of the operating field in a spatial direction opposite the direction of the pressure application.

2. Method according to claim 1, characterized in that the confirmation signal is output only if it is detected that the contact area of the actuating element has been increased by the predetermined factor.

3. Method according to claim 2, characterized in that the confirmation signal is output only if, after the increase of the contact area by the predetermined factor, it is detected that the contact area of the actuating element had been subsequently decreased by the predetermined factor or an additional predetermined factor.

4. Method according to claim 1, characterized in that the length of time is detected over which the increase by the predetermined factor and/or the decrease of the contact area by the predetermined factor or additional predetermined factor occurs, and the confirmation signal is output only if the change of the contact area occurs within a predetermined time period.

5. Method according to claim 1, characterized in that the length of time is detected over which the pressure exertion on the operating field occurs, and the confirmation signal is output only if the pressure threshold value has been exceeded within a predetermined time period.

6. Method according to claim 1, characterized in that, as confirmation signal, an acoustic signal is output.

7. Method according to claim 1, characterized in that the detection of the length of time over which the change of the contact area and/or the pressure exertion on the operating field occur(s) is started as soon as a touching of the operating field by means of the operating element has been detected.

8. Unit with an operating system, with
- a pressure detection device, which is designed to detect whether an operating field of the operating system has been exposed by means of an actuating element to a greater pressure than a predetermined pressure threshold value;
- a control device which is designed so that, if it is detected that the operating field is exposed to a greater pressure than the pressure threshold value, the outputting of at least one confirmation signal by means of the operating field occurs;

characterized in that
- the operating system comprises a detection device which is designed to detect the size of a contact area of the actuating element that touches the operating field;
- the control device is designed to cause an outputting of the confirmation signal only if, during the pressure exertion on the operating field, it is detected that the contact area of the actuating element has been changed by a predetermined factor, wherein the detection of the change of the contact area is used to protect against undesired erroneous triggering; and
- wherein the confirmation signal is a haptically detectable feedback, output in the form of an at least partial shifting of the operating field in a spatial direction opposite the direction of the pressure application.

9. Unit according to claim 8, characterized in that the unit is a motor vehicle, a smart phone, a notebook or a stationary computer, in which the operating system is integrated.

\* \* \* \* \*

UNITED STATES PATENT AND TRADEMARK OFFICE
CERTIFICATE OF CORRECTION

PATENT NO. : 10,216,328 B2
APPLICATION NO. : 14/776496
DATED : February 26, 2019
INVENTOR(S) : Kuehne et al.

Page 1 of 1

It is certified that error appears in the above-identified patent and that said Letters Patent is hereby corrected as shown below:

In the Claims

Column 6,
Line 44, "confimation signal" should read --confirmation signal--.

Signed and Sealed this
Twenty-eighth Day of April, 2020

Andrei Iancu
*Director of the United States Patent and Trademark Office*